(12) United States Patent
Hwang et al.

(10) Patent No.: US 10,928,175 B2
(45) Date of Patent: Feb. 23, 2021

(54) LENGTH MEASURING DEVICE

(71) Applicant: BAGEL LABS CO., LTD., Seongnam-si (KR)

(72) Inventors: Jung Hoon Hwang, Bucheon-si (KR); Sung Seek Ham, Seoul (KR); Myung Jong Kim, Seoul (KR); Jun Young Park, Yongin-si (KR)

(73) Assignee: BAGEL LABS CO., LTD., Seongnam-si (KR)

(*) Notice: Subject to any disclaimer, the term of this patent is extended or adjusted under 35 U.S.C. 154(b) by 222 days.

(21) Appl. No.: 16/172,978

(22) Filed: Oct. 29, 2018

(65) Prior Publication Data

US 2019/0310065 A1    Oct. 10, 2019

(30) Foreign Application Priority Data

Apr. 6, 2018 (KR) .................. 10-2018-0040637

(51) Int. Cl.
| | |
|---|---|
| *G01B 3/1041* | (2020.01) |
| *G01B 3/1056* | (2020.01) |
| *G01B 3/1084* | (2020.01) |
| *G01B 3/1003* | (2020.01) |
| G01B 3/1043 | (2020.01) |
| G01B 3/1046 | (2020.01) |
| G01B 3/1094 | (2020.01) |

(52) U.S. Cl.
CPC ......... *G01B 3/1041* (2013.01); *G01B 3/1003* (2020.01); *G01B 3/1056* (2013.01); *G01B 3/1084* (2013.01); G01B 3/1043 (2020.01); G01B 3/1046 (2020.01); G01B 3/1094 (2020.01)

(58) Field of Classification Search
CPC .. G01B 3/1041; G01B 3/1003; G01B 3/1056; G01B 3/1084; G01B 3/1043; G01B 3/1046; G01B 3/1094; G01B 3/1069; G01B 2003/1023; G01B 3/1005
USPC .......................................................... 33/769
See application file for complete search history.

(56) References Cited

U.S. PATENT DOCUMENTS

| | | | | |
|---|---|---|---|---|
| 5,193,287 A | * | 3/1993 | Coulter .................. | A61B 5/107 33/511 |
| 5,367,785 A | * | 11/1994 | Benarroch ............ | E05B 67/006 33/755 |
| 5,371,949 A | * | 12/1994 | Delaurier ............... | A63C 19/06 33/1 G |
| 5,414,943 A | * | 5/1995 | Vogt ..................... | A61B 5/1079 33/764 |

(Continued)

FOREIGN PATENT DOCUMENTS

| | | |
|---|---|---|
| CN | 2136455 Y | 6/1993 |
| JP | 2009-247869 A | 10/2009 |
| JP | 3194702 U | 12/2014 |

*Primary Examiner* — Yaritza Guadalupe-McCall
(74) *Attorney, Agent, or Firm* — Rabin & Berdo, P.C.

(57) ABSTRACT

A length measuring device includes a hook (380) to which a ring of the tape tip is hooked and retained, and the hook (380) includes a first hook (380-1) and a second hook (380-2) provided on both sides of an outlet perpendicularly to each other, in which, when the ring at a leading end of the tape tip is hooked with the first hook or the second hook, a surface of the first hook or the second hook is brought into contact with a rectangular inner peripheral surface of the fastening hole (305), such that the tape tip is retained perpendicularly to the first hook or the second hook.

6 Claims, 10 Drawing Sheets

(56) References Cited

U.S. PATENT DOCUMENTS

| | | | | |
|---|---|---|---|---|
| 6,817,110 B2* | 11/2004 | Bohnengel | ............ | G01B 3/1056 33/511 |
| 6,978,553 B2* | 12/2005 | Doublet | ................. | G01B 5/245 33/1 G |
| 7,047,659 B2* | 5/2006 | Holland | ............... | G01B 3/1084 33/760 |
| 7,146,743 B2* | 12/2006 | Oura | ...................... | G01D 5/363 33/756 |
| 7,584,549 B2 | 9/2009 | Lee et al. | | |
| 8,146,261 B1* | 4/2012 | Perry | .................... | G01B 3/1084 33/511 |
| 2008/0276477 A1 | 11/2008 | Albrecht | | |
| 2011/0258869 A1* | 10/2011 | Bittkowski | ............ | A61B 5/107 33/512 |
| 2012/0266479 A1* | 10/2012 | Park | ..................... | G01B 5/0035 33/712 |
| 2014/0196301 A1* | 7/2014 | Towns | ..................... | A43D 1/08 33/769 |
| 2014/0250708 A1* | 9/2014 | Bauer | ................. | G01B 3/1061 33/760 |
| 2019/0310064 A1* | 10/2019 | Ham | .................... | G01B 3/1041 |

* cited by examiner

LENGTH MEASURING DEVICE

CROSS-REFERENCE TO RELATED APPLICATIONS

This application claims priority from Korean Patent Application No. 10-2018-0040637, filed on Apr. 6, 2018 in the Korean Intellectual Property Office, the disclosure of which is incorporated herein by reference in its entirety.

BACKGROUND

Technical Field

The present disclosure relates to a length measuring device, and more particularly, to a length measuring device capable of maintaining a tension on a length measuring means, i.e., on a measuring tape ("tape") during measurement, with an operating gear provided therewith to externally operate a rotation of a bobbin wound with tape, and also improving user convenience with a means provided therewith to conveniently retain an end of the tape on a case.

Background Art

In general, a measuring tape is made in a tape form and provided with graduations indicative of length marked on a surface thereof so that it is used to measure a width or an area of a certain space, or to measure a size, a length, or a width of the measurement object. While there are several types of measuring tapes, a typical measuring tape includes a ruler wound in the form of a coil and is marked with graduations on the surface thereof, and a case having an inner space for accommodating the ruler and an entrance for guiding pull-in an pull-out of the ruler stored in the inner space. In order to measure the length of the measurement object, a user of the measuring tape can pull out the ruler marked with the graduation and read the graduation on one end and a body portion of the ruler when the ruler reaches an end of the subject being measured. Recently, instead of directly reading the graduation marked on the measuring tape, an electronic length measuring device has been developed, which electronically measures the length of a tape being pulled out and indicates the result as a numerical value. Such an electronic length measuring device measures the pull-out length of the tape by sensing the number of rotations of the bobbin wound with the measuring tape and calculating the pull-out length based on the sensed result.

However, when measuring a circumference of a measurement object such as waist of human body with the conventional electronic length measuring device, there is a problem that the accuracy of the measurement is lowered because there is no means provided to keep the tape in a tight state while the tape is wrapped around the circumference of the measurement object. In addition, when measuring the circumference, since the conventional electronic length measuring device does not have any means that can conveniently retain an end of the tape on the case, there is a problem that it is difficult to operate the electronic length measuring device with one hand.

SUMMARY

It is an object of the present disclosure to provide a means for allowing a tape of an electronic length measuring device to be held in a tensioned state even when the tape is wrapped around a measurement object, and to provide a means for retaining an end of the tape with the tape being held in a tensioned state, thereby improving user convenience.

According to an aspect of the present disclosure, a length measuring device is provided, which may include a bobbin 350 rotatably provided within a case and wound with a tape wound on an outer circumference thereof, a sensor 126 that senses an amount of rotation of the bobbin which is rotated by the tape being pulled out, a tape tip 300 attached to a leading end of the tape, and provided with a ring 303 at a leading end thereof, a fastening hole 305 formed within the ring at the tape tip, and a hook 380 which is provided at one side of an outlet 370 of the case through which the tape is pulled out, and at which the ring of the tape tip is hooked and retained.

The hook 380 may include a first hook 380-1 and a second hook 380-2 provided on both sides of an outlet perpendicularly to each other, and the first hook and the second hook may be formed to protrude in a circumferential direction at one point of the case, with an end of the first hook being formed in a direction facing toward the outlet, and an end of the second hook being formed in a direction facing away from the outlet. When the ring at a leading end of the tape tip is hooked with the first hook or the second hook, a surface of the first hook or the second hook is brought into contact with a rectangular inner peripheral surface of the fastening hole 305, such that the tape tip is retained perpendicularly to the first hook or the second hook.

With the configuration described above according to embodiments of the present disclosure, a tape of an electronic length measuring device can be held in a tensioned state even when the tape is wrapped around a measurement object, thereby providing an advantageous effect of reduction in measurement errors.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
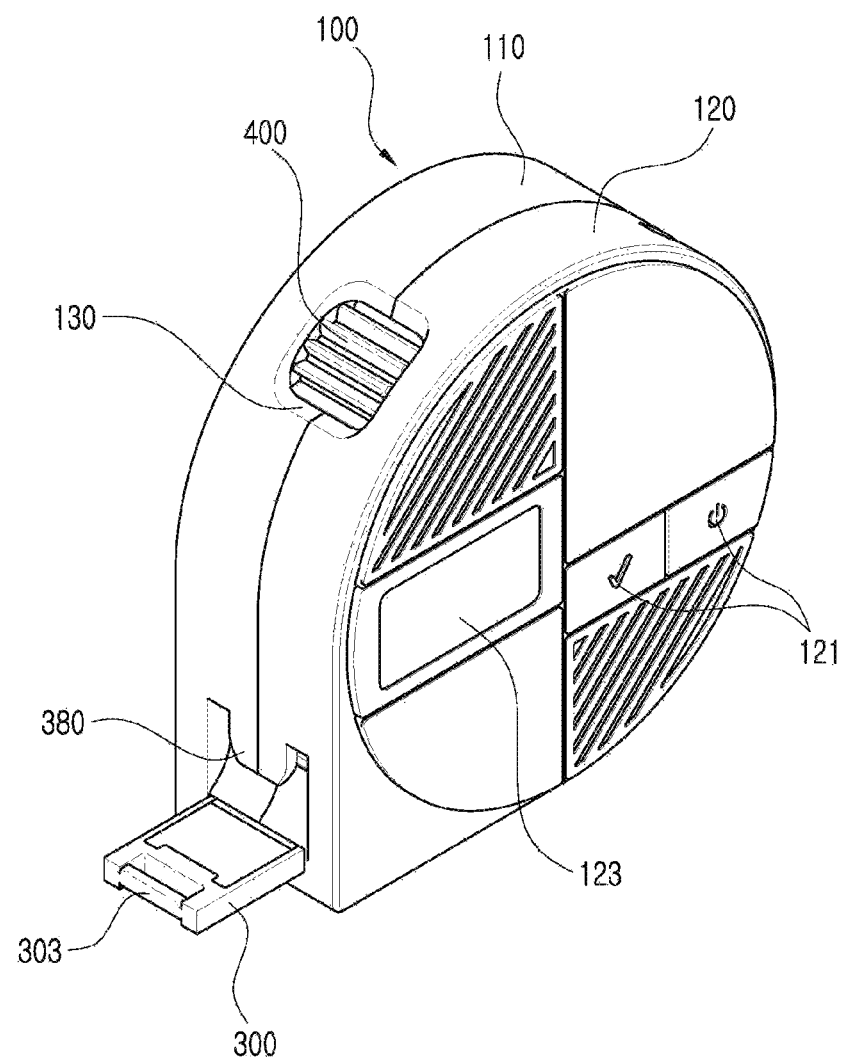
FIG. 1 is a schematic perspective view of a length measuring device according to an embodiment of the present disclosure.
Figure 2:
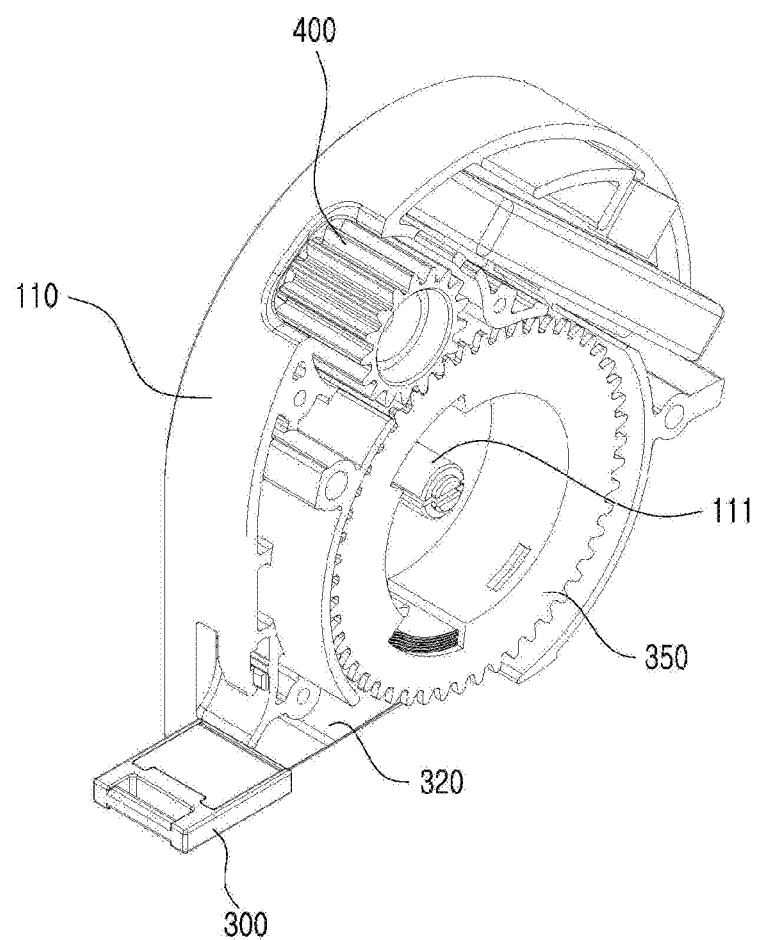
FIGS. 2 and 3 are exploded perspective views of a case of a length measuring device according to an embodiment of the present disclosure.
Figure 3:
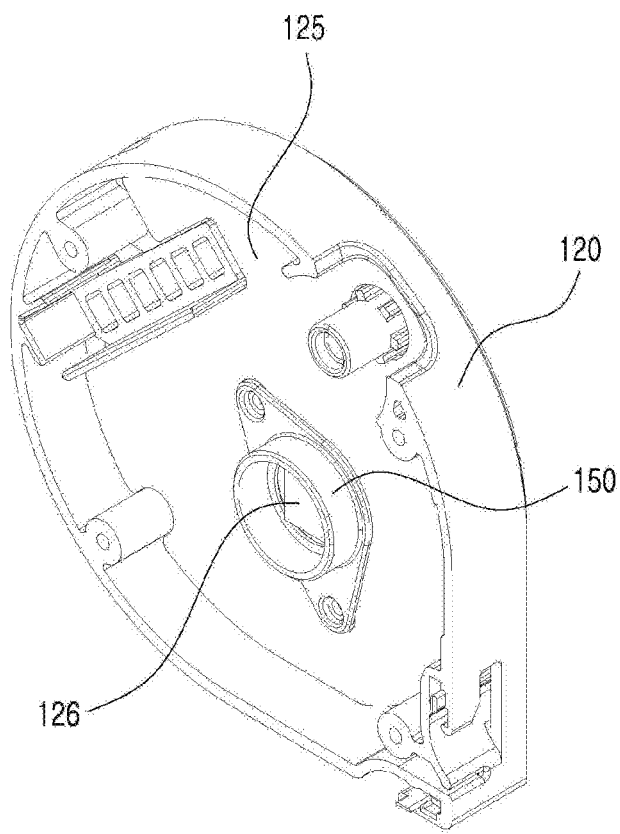
Figure 4:
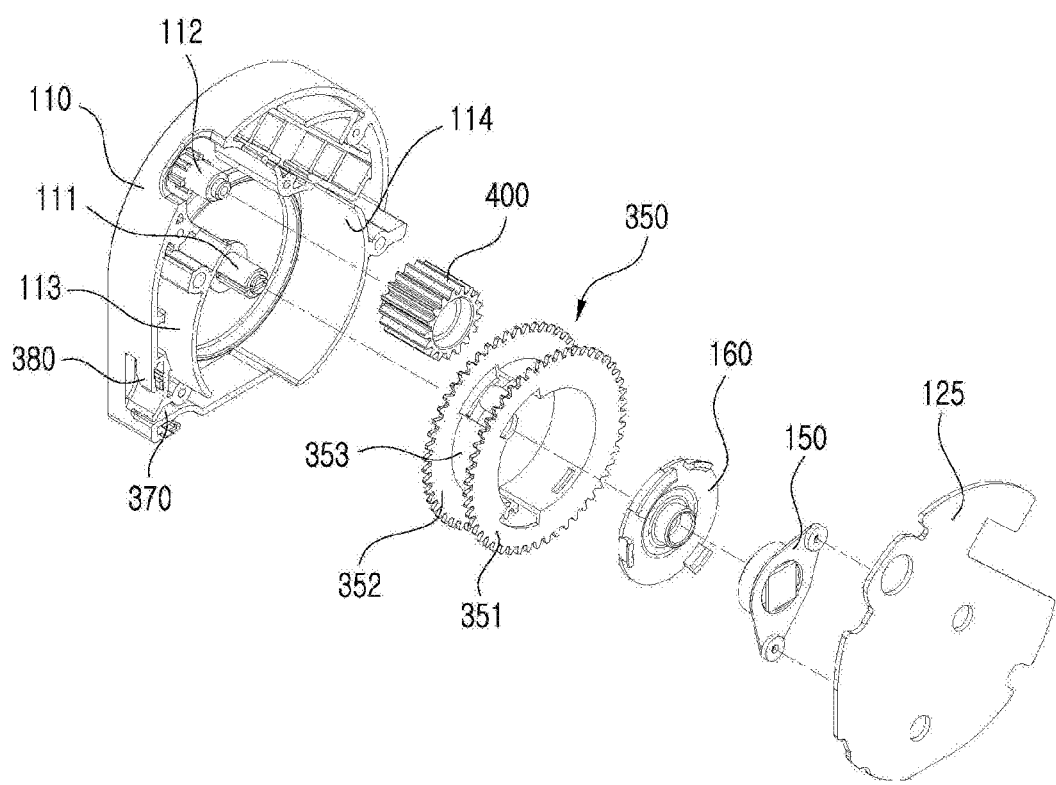
FIG. 4 is an exploded perspective view showing an inner configuration of a length measuring device according to an embodiment of the present disclosure.

FIG. 1 is a schematic perspective view of a length measuring device according to an embodiment of the present disclosure, FIGS. 2 and 3 are exploded perspective views of a case of a length measuring device according to an embodiment of the present disclosure, and FIG. 4 is an exploded perspective view showing an inner configuration of a length measuring device according to an embodiment of the present disclosure.

The length measuring device (also referred herein as "electronic length measuring device") according to the present disclosure measures a length of a desired portion based on the measuring tape (hereinafter, simply referred as "tape") pulled out of a case 100 by calculating an extent by which the measuring tape is pulled out of the case 100. Specifically, it is a tool that can sense an amount of rotation of a rotator and calculate the length of the desired portion by calculating the extent by which the tape is pulled out, based on the sensed amount of rotation.

Referring to FIG. 1, the length measuring device 100 according to the present disclosure has a configuration in which a first case 110 and a second case 120 are coupled to each other, while containing therein components for measuring a length, and on the surface of the second case 120, there are provided an operating button 121 such as a power button for operating the device, and a display unit 123 for displaying necessary information such as a measured length, and so on. On one side of the case 100, there is provided a passage through which the inner tape is pulled outside, and a tape tip 300, to which an end of a tape is attached, is positioned in the passage, with the tape tip 300 being in contact with the case due to an inward elastic force acting on the tape.

Referring to FIGS. 2 to 4, a bobbin axis 111 and a gear axis 112, which are two inwardly projecting axes, are provided inside the first case 110. The bobbin axis 111 is a center axis on which a bobbin 350 is mounted to be mounted inside the case, and the gear axis 112 is a center axis on which an operating gear 400 to be described below is mounted. The bobbin 350 includes a first disk 351 and a second disk 352 each in the form of a thin disk, and an inner cylinder 353 connecting the first disk 351 and the second disk 352. A first gear is formed on outer circumferential surfaces of the first disk 351 and the second disk 352 in the same shape, and the inner cylinder 353 is a portion on which the tape 320 is wound. When the tape tip 300 is pulled, the bobbin 350 is rotated and the tape 320 wound around the bobbin 350 is pulled outside for measuring the length.

The operating gear 400 is a cylindrical member that is mounted on the gear axis 112 to be rotated, and has a second gear formed on the entire outer circumferential surface along the length direction, and the first gear formed on the outer circumferential surfaces of the first disk 351 and the second disk 352 and the second gear of the operating gear are rotated in mesh with each other. The operating gear 400 is mounted on a gear axis 112 provided inside the case, but may be provided such that a portion of the second gear is exposed to the outside for the user to operate the operating gear with his/her hand. That is, the user may rotate the bobbin to the left and right by rotating the operating gear to the left and right. This can be easily utilized particularly when the user wants to pull the tape more tightly in a state that the tape is already rolled onto the bobbin. For example, in the process of measuring length, when the user rotates the operating gear 400 with the tape tip 300 being retained at a certain position, the bobbin 350 is rotated in the opposite direction by the gears meshed with each other, thereby applying more tension to the tape 320.

In the present disclosure, when measuring a circumference of a round object such as the waist of a human body, in order to provide more accurate circumferential measurement values, it is preferable to pull out the tape tip and wrap around the circumference, then retain the tape tip at a specific position, and then apply tension to the tape while holding the tape tip in the retained state. To this end, the operating gear 400 may be rotated so as to apply a rotational force to the bobbin in a direction opposite to the tape pull-out direction, so that the pulled-out tape can be tightened to a taut state.

The second case 120 of the electronic length measuring device according to the present disclosure includes a circuit board 125 that is embedded with the parts for performing calculations necessary for the length measurement by the operation of the operating button, or the like. The circuit board 125 includes various electronic components for operating a display part, a button part, a magnetic encoder, and the like, to enable the electronic length measuring device to perform the length measuring operation.

The length measuring device according to the present disclosure adopts a method of detecting changes in the magnetic field generated by the rotation of the magnet and detecting an amount of rotation of the bobbin 350 on the basis of the change in the magnetic field, and then measuring a length, and a magnetic encoder 126 is embedded in the circuit board 125 to serve as a sensor to sense the amount of rotation of the magnet. According to the present disclosure, the magnet M is rotated together with the bobbin, which will be described below with reference to FIG. 6.

The electronic length measuring device according to the present disclosure further includes an outlet 370 formed as a passage through which the tape 320 is pulled out of the case, and a hook 380 formed on a side of the outlet 370 of the case to be hooked with a ring 303 of the front end of the tape tip 300 after the tape tip and the tape are pulled out of the case. The tape tip 300 has a rectangular fastening hole 305 (FIG. 1) formed within the ring 303, such that the hook 380 is inserted and hooked into the fastening hole. This will be described in detail with reference to FIGS. 9 and 10.

In FIG. 4, although not specifically described, a reference numeral '114' denotes a partition wall disposed around the bobbin 350 to surround the bobbin 350.

The electronic length measuring device according to the present disclosure has anti-tilt members 150 and 160 that prevent the bobbin 350 from inclining ("tilting") with respect to the axis of rotation of the bobbin while the bobbin 350 is rotated, and this will be described below with reference to FIGS. 5 and 6.

Figure 5:
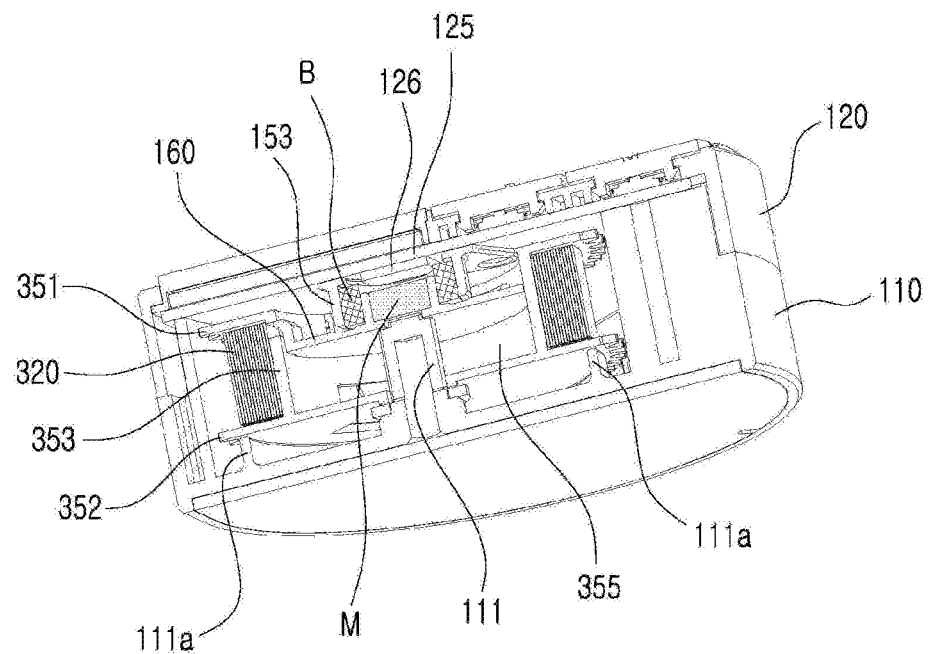
FIG. 5 is a side cross-sectional view of an interior of a length measuring device according to an embodiment of the present disclosure.
Figure 6:
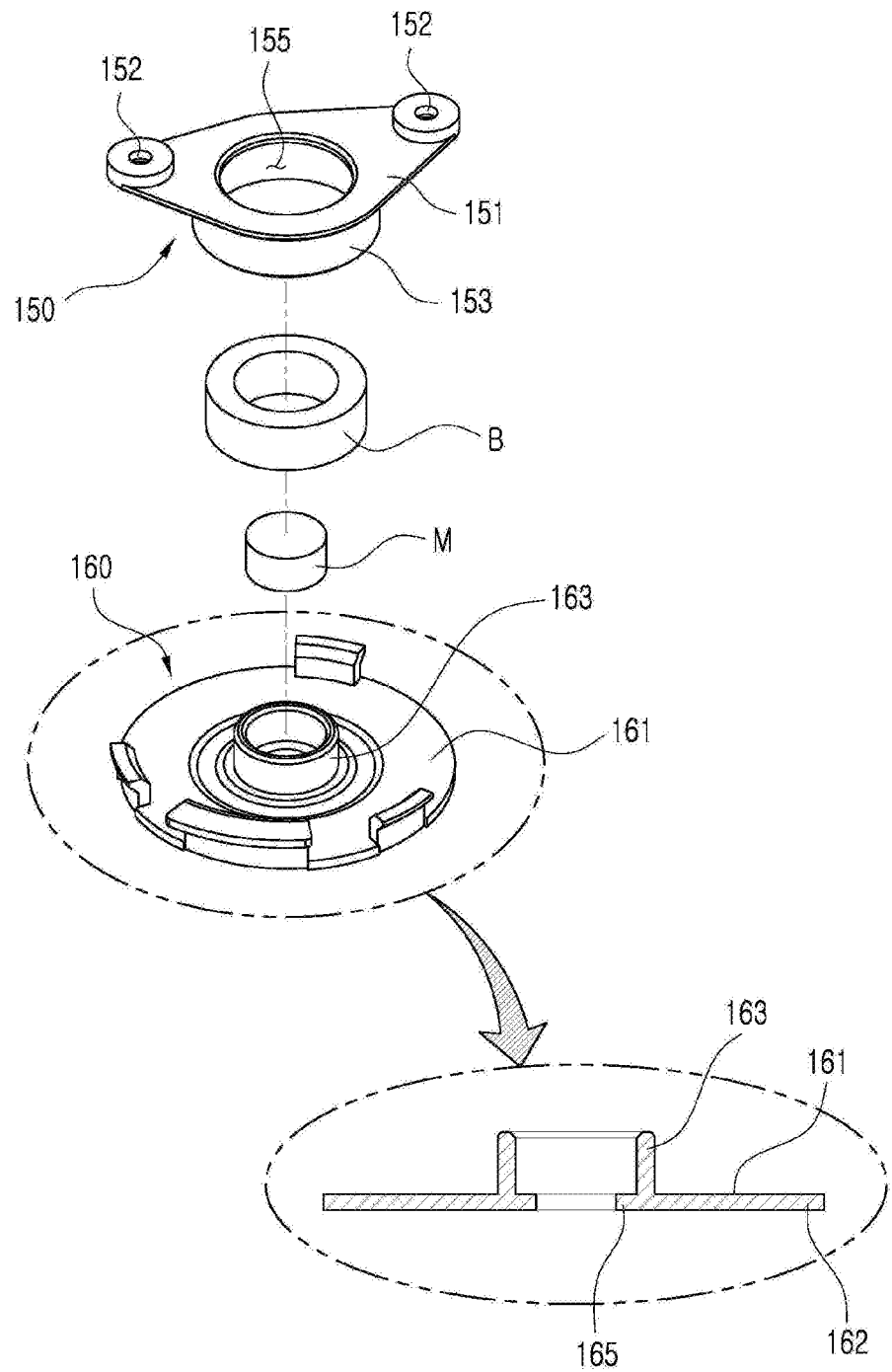
FIG. 6 is a partially enlarged perspective view of a length measuring device according to an embodiment of the present disclosure.
Figure 7:
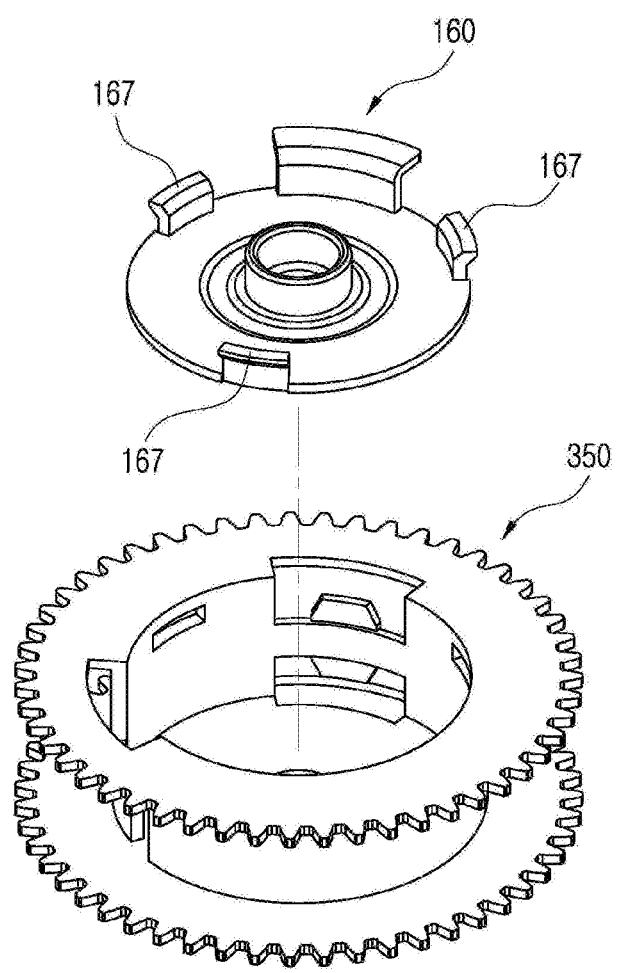
FIG. 7 is a view showing some components of the electronic length measuring device and relationship in which they are connected, according to an embodiment of the present disclosure.

FIG. 5 is a side cross-sectional view of an interior of an electronic length measuring device according to an embodiment of the present disclosure, FIG. 6 is a partially enlarged perspective view of a length measuring device according to an embodiment of the present disclosure, and FIG. 7 is a view showing some components of the electronic length measuring device and relationship in which they are connected, according to an embodiment of the present disclosure.

The bobbin 350 includes a first disk 351 and a second disk 352, each being in the form of a thin disk, and an inner cylinder 353 connecting the first disk 351 and the second disk 352, as described above. Specifically, the second disk 352 is in the shape of a disk having a fastening hole formed at a center to be mounted on the bobbin axis 111, and the first disk 351 is formed such that an inner side thereof is extended no further than the inner cylinder 353. Therefore, as shown in FIG. 5, a U-shaped space with an open top is defined by the inner cylinder 353 and the second disk 352, in an upward direction of the second disk and in an inward direction (in an axis direction) of the inner cylinder 353, and this space is referred to herein as a bobbin inner space 355' for the sake of convenience.

The electronic length measuring device according to the present disclosure includes the anti-tilting members 150 and 160 to prevent the rotating bobbin 350 from being tilted. The anti-tilt members include a first anti-tilt member 150 fixed to the circuit board 125 and a second anti-tilt member 160 fixed to the bobbin inner space 355.

The first anti-tilt member 150 is an approximately rhombic plate, and includes a first horizontal fixing part 151 coupled to the circuit board 125 by a piece using a coupling hole 152 and a vertical fixing part 153 formed in a cylindrical shape vertically to the first horizontal fixing part 151.

The second anti-tilt member 160 has a circular plate shape, and includes a second horizontal fixing part 161 coupled to the inner circumferential surface of the inner cylinder 353 in the bobbin inner space 355, and a second vertical fixing part 163 formed in a cylindrical shape vertically to the second horizontal fixing part.

As shown in FIG. 5, the first vertical fixing part 153 is protruded downward from the first horizontal fixing part 151, and the second vertical fixing part 163 is protruded upward from the second horizontal fixing part 161, and a bearing B is provided between the first vertical fixing part 153 and the second vertical fixing part 163 to facilitate the rotation. That is, the outer circumferential surface of the bearing B is in contact with the first vertical fixing part 153, and the inner circumferential surface of the bearing is in contact with the second vertical fixing part 163. The magnet M is coupled with the inner space of the second vertical fixing part 163, and the magnet M is rotated together with the second vertical fixing part according to the rotation of the bobbin. The first vertical fixing part 153 is protruded downward from the first horizontal fixing part 151, and the lower end of the first vertical fixing part 153 is in contact with the upper surface of the second horizontal fixing part 161.

The lower end of the first vertical fixing part 153 may be entirely in contact with the upper surface of the second horizontal fixing part 161. However, in some embodiments, several protrusions may be protruded downward from the lower end of the first vertical fixing part 153 in a hemispherical shape, while being spaced apart from each other at predetermined intervals, and these downward protrusions may be in contact with the upper surface of the second horizontal fixing part, thereby preventing tilting motion of the rotating bobbin. With the configuration described above, the friction force due to the rotation can be reduced as compared to an example where the entire lower end of the first vertical fixing part is in contact, which is more advantageous for the rotation of the bobbin.

The second anti-tilt member 160 is rotated together with the bobbin, because the outer circumferential surface 162 of the second horizontal fixing part 161 is brought into contact with the inner cylinder 353 of the bobbin when the second anti-tilt member 160 is coupled. In addition, the second anti-tilt member 160 is rotatably engaged, as the inner circumferential surface 163 of the second horizontal fixing part 161 is brought into contact with the upper end of the bobbin shaft 111.

The bobbin 350 of the electronic length measuring device according to the present disclosure is configured such that the second disk 352 is rotatably mounted on the lower end of the bobbin axis 111 and the inner circumferential surface 163 of the second horizontal fixing part 161 is rotatably mounted while contacting the upper end of the bobbin shaft 111, which allows the bobbin to be rotatably mounted on the upper and lower sides of the bobbin side.

In addition, preventing the bobbin from being tilted during rotation increases the accuracy of rotation and also increases the accuracy of measurement, and in order to prevent the tilting, a bearing B is provided between the first vertical fixing part 153 and the second vertical fixing part 163 for precise and smooth rotation, and the lower end of the first vertical fixing part 153 is in contact with the upper surface of the second horizontal fixing part 161. Thus, the first and second anti-tilt members with the first and second vertical fixing parts prevent the tilting motion of the bobbin during rotation of the bobbin.

In addition, according to the present disclosure, a circular support 112 is formed in a circular shape vertically upward from the inside of the first case 110 and is in contact with the lower end of the second disk 353 of the bobbin 350. The circular support 112 also supports the lower end of the rotating bobbin, thereby preventing the tilting motion.

The magnet M coupled with the inner space of the second vertical fixing part 163 may be a permanent magnet of a cylindrical shape and the magnet M may be magnetized in one direction perpendicular to the axis of rotation. The magnetic encoder 126, which is a sensor for sensing the amount of rotation of the magnet, may detect the change in the magnetic field generated by the rotation of the magnet when the bobbin 350 is rotated in accordance with the tape 320 being pulled in or out, and calculate the amount of rotation of the bobbin. The magnetic encoder is mounted on the circuit board so as to sense a magnetic force emitted from the magnet, and is mounted on the magnet, or more specifically, is disposed in the inner space of the first vertical fixing part 153. When the amount of rotation of the magnet is sensed, the amount of rotation of the bobbin can be known, and as a result, the length of the tape being pulled out can be calculated, so that the length of the measurement object can be calculated.

Figure 8:
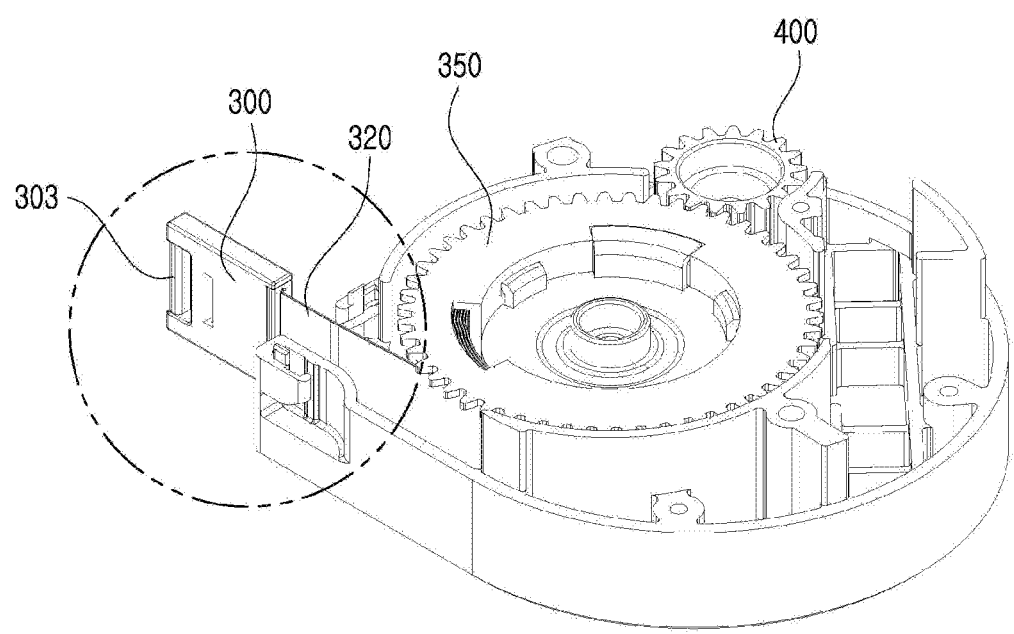
FIG. 8 is a view of a length measuring device in an open state according to an embodiment of the present disclosure, viewed from a different angle.
Figure 9:
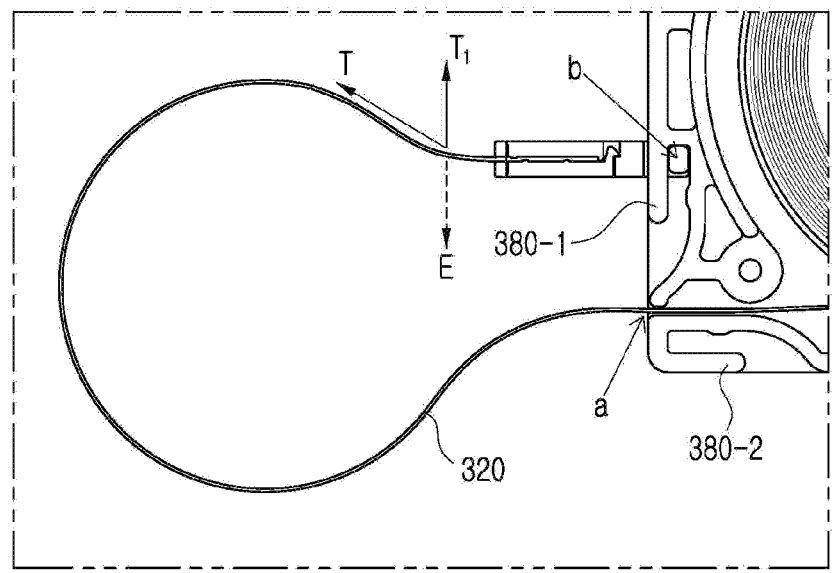
FIGS. 9 and 10 illustrate a tape tip retained with a hook in a length measuring device according to an embodiment of the present disclosure.
Figure 10:
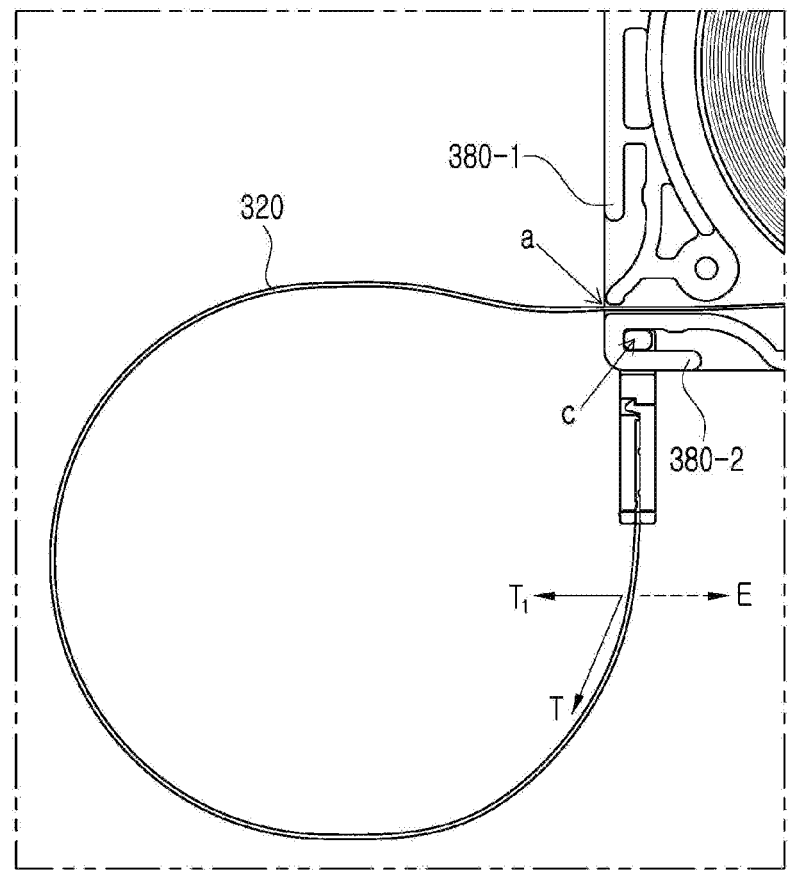

FIG. 8 is a view of an electronic length measuring device in an open state according to an embodiment of the present disclosure, viewed from a different angle, and FIGS. 9 and 10 illustrate a tape tip retained with a hook in a length measuring device according to an embodiment of the present disclosure. FIGS. 9 and 10 illustrate an example of measuring a length of a circumference of a rounded object (e.g., circumference of waist of a human body, or the like) with an electronic length measuring device according to the present disclosure, and in this example, the tape tip 300 can be retained with the hook 380 formed on one side of the case. As a result, when measuring the length, a user is able to conveniently operate the switch, confirm the numerical values, and the like, while holding the case with only one hand instead of the two hands.

Referring to the drawings, the hook 380 for retaining the tape tip is formed on one side of the outlet 370 through which the tape is pulled out by the tape tip 300 for pulling out the tape in the electronic length measuring device according to the present disclosure. The ring 303 is formed on a leading end of the tape tip to be hooked with the hook such that the hook 303 of the tape tip can be hooked with the hook 380 to retain the tape tip when the tape forms a loop for measuring a rounded perimeter such as a waist. According to the present disclosure, the tape tip 300 is always provided outside the case. Therefore, when measuring the length, the tape 320 is measured from the pull-out start point (a) at which the tape 320 is pulled out of the case to an end (b) of the tape tip, which will be described below.

Referring to FIG. 9, two hooks 380 may be formed on the upper side and the lower side of the outlets, respectively, and the hooks provided on both sides of the outlets will be referred as "first hook 380-1 and second hook 380-2", for convenience of explanation. The first hook 380-1 is a portion where the tape tip is retained when the pulled-out tape is curved in a clockwise direction to form a loop (FIG. 9), and the second hook 380-2 is a portion where the tape tip is retained when the pulled-out tape is wrapped around in a counter-clockwise direction to form a loop (FIG. 10). Once the ring 303 of the tape tip is caught in the first hook 380-1 or the second hook 380-2 and is entered into the inner groove and retained therein, the tape tip is not separated from the case.

In the electronic length measuring apparatus according to the present disclosure, the hook 380 is characterized in that: 1) the two hooks are formed in a perpendicular relation and in a circumferential direction of the case; and 2) the end of the first hook is formed in a direction facing toward the outlet, and the end of the second hook is formed in a direction facing away from the outlet.

1) By the 'perpendicular relation', this means that the first hook 380-1 is formed in a longitudinal direction, and the second hook 380-2 is formed in a horizontal direction. In addition, the first and second hooks are formed in the circumferential direction at one point on the case, and this means that the protrusions are formed along the surface of the case, rather than in a direction protruding vertically outward from the surface of the case.

2) With reference to the outlet 370 of the tape 320, the end of the first hook 380-1 is formed in a direction facing toward the outlet, and the end of the second hook 380-2 is formed in a direction facing away from the outlet. This is to ensure that the tape tip is firmly engaged with the hook and not detached from the hook when the tape is pulled out and formed into a loop to measure the length of a circumference in either of the counter-clockwise and clockwise directions. In addition, when the ring at the leading end of the tape tip is hooked with the first hook or the second hook, the surface of the first hook or the second hook is brought into contact with the rectangular inner peripheral surface of the fastening hole 305, such that the tape tip is retained perpendicularly to the first hook or the second hook.

Referring to FIG. 9 showing the tape formed into a loop shape in a clockwise direction, the tape 320 applies a tension T to the tape tip 300, and component force T1 of the tension T exerts a force on the tape tip 300 in an upward direction (FIG. 9). Such a direction of the component force T1 is the direction opposite to an unhooking direction E. The "unhooking direction E" as used herein refers to a direction in which the tape tip is separated from the first hook in a direction toward the end of the first hook 380-1. According to the present disclosure, since the component force T1 of the tensile force exerts a force on the tape tip in a direction opposite to the unhooking direction E, the effect of preventing the tape tip from being detached from the first hook is obtained.

Referring to FIG. 10, when the tape is formed into a loop shape in a counter-clockwise direction, the tape 320 applies a tension T to the tape tip 300. Likewise, the component force T1 of the tension T is directed in a direction opposite to the unhooking direction E. Therefore, even when the tape is formed into a loop shape in the counter-clockwise direction, the effect of preventing the tape tip 300 from being detached from the second hook 380-2 is obtained.

Referring back to FIG. 9, when measuring the circumference of an object or a body using the electronic length measuring device according to the present disclosure, the length is measured from the pull-out start point (a) at which the tape 320 is pulled out of the case to the end (b) of the tape tip. That is, the measurement length is measured from a to b, and then the measurement value is outputted through a display on a front face of the case as a length of the curve. In the example of FIG. 10, the distance from a to c is measured and displayed in a similar manner.

In this structure, when the ring at the leading end of the tape tip is hooked with the first hook or the second hook, the surface of the first hook or the second hook is brought into contact with the rectangular inner peripheral surface of the fastening hole 305, such that the tape tip is retained perpendicularly to the first hook or the second hook. To this end, the rectangular fastening hole 305 is formed within the ring of the tape tip (FIG. 1), and the present disclosure can minimize the measurement errors using the perpendicular fastening structure. The length measuring device according to the present disclosure has a structure that is capable of measuring the circumferential length of a measurement object in a clockwise or counter-clockwise direction, while minimizing the measurement errors that can occur in either of the directions.

Figure 11:
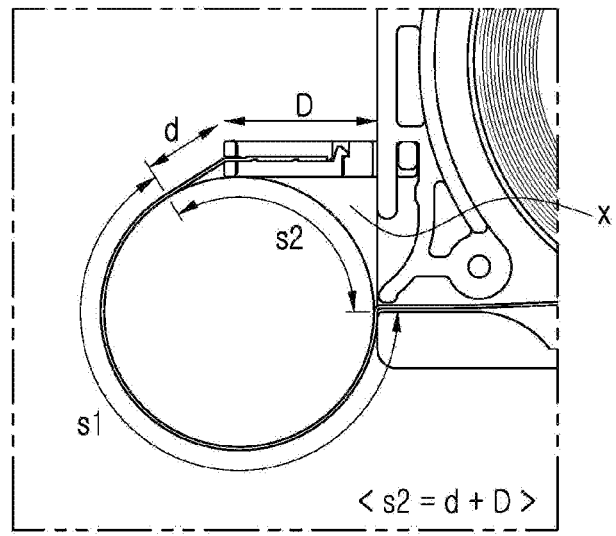
FIGS. 11 and 12 are views showing a state of use when measuring a measurement object in a round-shape.
Figure 12:
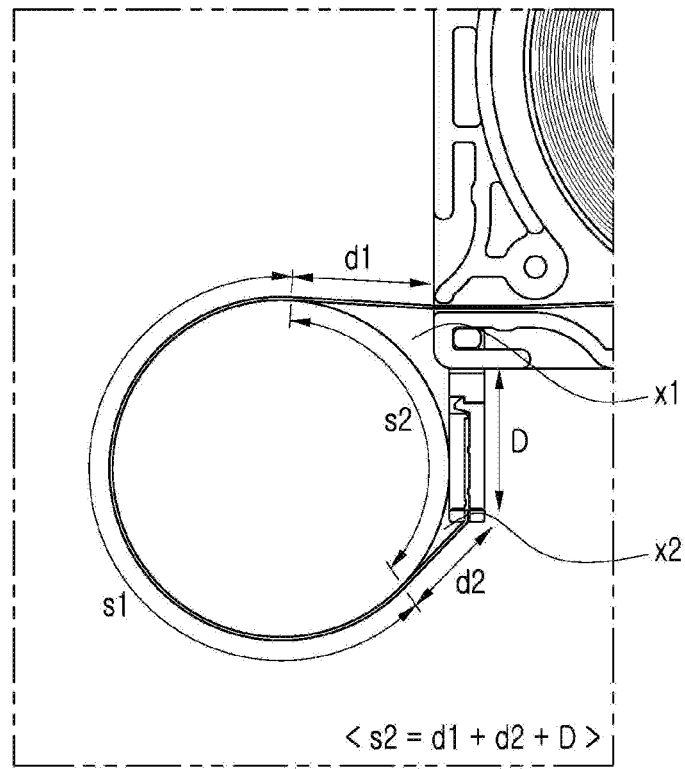

FIGS. 11 and 12 illustrate how the circumference is actually measured, according to the present disclosure (note that FIGS. 9 and 10 show only the tape tip being fastened, while omitting illustration of the measurement object).

As shown in FIG. 11, there is a space (x) of approximately triangular shape defined between the length measuring device 100 and the measurement object (in rounded shape), and according to the present disclosure, it is possible to accurately measure the length despite the presence of the space (x) between the length measuring device and the measurement object. This is enabled by the structure in which, when the ring at the leading end of the tape tip is hooked with the first hook or the second hook, the tape tip is retained perpendicularly to the first hook or the second hook, and the relation (s2=d+D) in which a length (s2) of the circumferential length of the measurement object excluding a length (s1) of the portion in contact with the tape is equal to a sum of the length (d) of a portion of the tape 320 not in contact with the measurement object and a length (D) of the tape tip 300.

FIG. 12 shows a measurement in the opposite direction to that of FIG. 11.

As shown in FIG. 12, there also are spaces (x1 and x2) of approximately triangular shape defined between the length measuring device 100 and the measurement object (in rounded shape), but despite of them, accurate length measurement is enabled. This is enabled by the structure in which the ring at the leading end of the tape tip is hooked with the hooks perpendicularly, and the relation (s2=d1+d2+D) in which a length (s2) of the circumferential length of the measurement object excluding a length (s1) of the portion in contact with the tape is equal to a sum of the length (d1+d2) of portions of the tape 320 not in contact with the measurement object and a length (D) of the tape tip 300.

According to the present disclosure, the tape is maintained perpendicularly to the hook when in the fastened state, regardless of whether the tape tip is fastened to the first hook or the second hook such that the length (s2) excluding the portion (s1) of the tape in contact with the actual measurement object is equal to the length (D) of the tape tip and the length (d) of the non-contact tape, and the measurement length is displayed in consideration of this. As a result, it is possible to measure the circumference of the measurement object with high precision, even though there is a space between the object and the measuring tape body.

In other words, according to the present disclosure, in order to ensure the structure that allows the perpendicular fastening relation described above, the rectangular fastening hole 305 formed within the ring at the tape tip is provided such that, when the ring at the leading end of the tape tip is hooked with the first hook or the second hook, the surface of the first hook or the second hook is perpendicular to the rectangular inner circumferential surface of the fastening hole 305. Since the surface of the hook and the inner circumferential surface of the fastening hole are in contact with each other, the tape tip 300 is prevented from tilting from the perpendicular state, and the perpendicular relation is maintained even when the perimeter size of the measurement object changes.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A length measuring device comprising:
   a bobbin (350) rotatably provided within a case and wound with a tape wound on an outer circumference thereof;
   a sensor (126) that senses an amount of rotation of the bobbin which is rotated by the tape being pulled out;
   a tape tip (300) attached to a leading end of the tape, and provided with a ring (303) at a leading end thereof;
   a fastening hole (305) formed within the ring at the tape tip; and
   a hook (380) which is provided at one side of an outlet (370) of the case through which the tape is pulled out, and at which the ring of the tape tip is hooked and retained,
   wherein the hook (380) comprises:
      a first hook (380-1) and a second hook (380-2) provided on both sides of the outlet perpendicularly to each other,
      and the first hook and the second hook are formed to protrude in a circumferential direction at one point of the case, with an end of the first hook being formed in a direction facing toward the outlet, and an end of the second hook being formed in a direction facing away from the outlet,
   wherein the length measuring device further comprises:
   a first gear formed on an outer circumference of the bobbin; and
   an operating gear (400) having a second gear on an outer circumference to be meshed with the first gear,
   wherein a rotation of the bobbin is controllable by operating the operating gear.

2. The length measuring device according to claim 1, wherein, when the ring at the leading end of the tape tip is hooked with the first hook or the second hook, a surface of the first hook or the second hook is brought into contact with a rectangular inner peripheral surface of the fastening hole (305), such that the tape tip is retained perpendicularly to the first hook or the second hook.

3. The length measuring device according to claim 2, wherein the ring at the leading end of the tape tip and the fastening hole of the tape tip are in rectangular shape.

4. The length measuring device according to claim 1, wherein a portion of the operating gear is exposed to the outside of the case.

5. The length measuring device according to claim 1, wherein the bobbin (350) comprises:
   a first disk (351) and a second disk (352) which are disk-shaped, spaced apart from each other while facing each other, and having the first gear is formed on an outer circumferential surface, respectively; and
   an inner cylinder (353) which connects the first disk and second disk and on which the tape is wound.

6. The length measuring device according to claim 5, wherein the operating gear (400) is a cylindrical member and has a second gear formed on an entire outer circumferential surface along a length direction,
   and the second edge is meshed with the first gear of both the first disk and the second disk.

* * * * *